United States Patent
Berry et al.

(10) Patent No.: US 11,655,389 B1
(45) Date of Patent: May 23, 2023

(54) METHOD OF TREATING LUMBER FOUNDATIONS IN BUILDINGS

(71) Applicants: Michael Vance Berry, Johns Creek, GA (US); Steve Mills, Madison, AL (US); Michael Watson, Tuscumbia, AL (US)

(72) Inventors: Michael Vance Berry, Johns Creek, GA (US); Steve Mills, Madison, AL (US); Michael Watson, Tuscumbia, AL (US)

( * ) Notice: Subject to any disclaimer, the term of this patent is extended or adjusted under 35 U.S.C. 154(b) by 0 days.

(21) Appl. No.: 17/460,557

(22) Filed: Aug. 30, 2021

Related U.S. Application Data

(63) Continuation-in-part of application No. 16/517,964, filed on Jul. 22, 2019, now abandoned.

(51) Int. Cl.
| | |
|---|---|
| *B05D 7/08* | (2006.01) |
| *C09D 15/00* | (2006.01) |
| *C09D 123/08* | (2006.01) |
| *C09D 5/14* | (2006.01) |
| *C08K 3/22* | (2006.01) |

(52) U.S. Cl.
CPC .............. *C09D 15/00* (2013.01); *B05D 7/08* (2013.01); *C09D 5/14* (2013.01); *C09D 123/0853* (2013.01); *C08K 2003/2296* (2013.01)

(58) Field of Classification Search
CPC .................................. B05D 7/08; C09D 15/00
See application file for complete search history.

(56) References Cited

U.S. PATENT DOCUMENTS

| | | | | |
|---|---|---|---|---|
| 4,011,388 A | * | 3/1977 | Murphy ................ | C08F 291/00 526/201 |
| 8,820,028 B2 | * | 9/2014 | Toas ...................... | E04D 13/152 442/325 |
| 2015/0056258 A1 | * | 2/2015 | Richardson ............ | A01N 25/00 424/409 |
| 2016/0145457 A1 | * | 5/2016 | Grunewalder ....... | C09D 175/16 427/372.2 |

* cited by examiner

*Primary Examiner* — Nathan T Leong
(74) *Attorney, Agent, or Firm* — Lanier Ford Shaver & Payne, PC; Gerald M. Walsh

(57) ABSTRACT

This invention provides method of treating a surface of exterior wood outside of buildings to inhibit the uptake of moisture into the wood by spraying on the surface of the wood an aqueous formulation consisting of one or more film forming non-chloride, long-chain polymers. The aqueous formulation forms a clear micro-film. Preferably, the long-chain polymer is polyethylene-vinyl acetate, polyurethane, or a combination thereof, wherein the clear micro-film contains no detectable volatile organic compounds. A clear colorant is added to the aqueous formulation to verify treatment. The clear colored micro-film maintains moisture content in the wood at 16 percent or less, allows for continued visual inspection of the surface of the wood for termite damage, does not rub off, get diluted with water, or become damaged by workers and pets who come into contact with the clear colored microfilm.

14 Claims, No Drawings

METHOD OF TREATING LUMBER FOUNDATIONS IN BUILDINGS

CROSS REFERENCE TO RELATED APPLICATIONS

This application claims priority to earlier filed U.S. Nonprovisional patent application Ser. No. 16/517,964, filed on Jul. 22, 2019, which claimed the benefit of U.S. Provisional Patent Application 62/765,334, filed on Aug. 22, 2018, the contents of which are herein incorporated by reference in their entirety.

FIELD OF THE INVENTION

This invention relates to methods for protecting lumber portions of foundations in buildings from damage due to water vapor and, more particularly, to methods of applying protective micro-films to surfaces of wooden framing and subfloors in crawl spaces of building foundations.

BACKGROUND OF THE INVENTION

When exposed to humidity, wood can absorb water moisture, and resulting differential expansion and contraction between portions of the boards can cause damage to the wood. Absorption of water into wood deteriorates and rots wood and accelerates growth of and damage by wood-destroying mold and fungus. Visqueen or polyethylene plastic sheets on the ground, poured concrete, pack-filled dirt, or other expensive methods fail to regulate moisture content in lumber structures. Failure to regulate moisture in wood weakens wood strength, causing subfloor warping and deflecting or sagging joists. Lumber structures associated with building foundations have been difficult to protect from moisture because they are on or in close proximity to the ground and are exposed to extreme outdoor weather conditions.

It is known to apply an aqueous formulation of polyvinylidene chloride to a surface of wood, inside buildings, to form plastic films thereon to protect the wood from moisture inside the buildings (see U.S. Patent Application No. 20160145457). However, these formulations have not been useful outside of buildings to adequately protect wood from moisture, for example, in crawl spaces of building foundations because the plastic films formed by these formulations are not sufficiently durable outside of buildings or during exposure to extreme weather conditions. In addition, polyvinyl chlorides and polyvinylidene chloride form dioxins when combusted, for example, in accidental fires or during disposal by incineration. Dioxins are potent carcinogens and it is preferable not to use chloride containing plastic polymers on buildings.

Application of a liquid spray that forms a plastic film of strong bonding strength on the surface of exterior wood, outside of a building, providing strong durability and a strong barrier to absorption of moisture, and not producing toxic byproducts, such as dioxins, would provide an improvement over existing methods for preventing moisture damage to lumber structures in exterior building foundations exposed to outdoor weather conditions.

SUMMARY OF THE INVENTION

This invention provides a method of treating a surface of wood to inhibit the uptake of moisture into the wood. The method includes providing an aqueous formulation comprising one or more non-chloride, film forming, long-chain polymers in water at 2-99 weight percent, spraying the aqueous formulation on the surface of the wood, and allowing the aqueous formulation to dry and form a micro-film on the surface of the wood. The one or more long-chain polymer is polyethylene-vinyl acetate or polyurethane, or a combination thereof. The long-chain polymer may be polymer wax, or a polymer oil, or a polymer adhesive. The wood can be exterior wood outside of a building and may include a floor framing system having joists, subflooring, and girder beams in a crawl space of the building. The micro-film contains no detectable volatile organic compounds. A clear coloring agent is added to the aqueous formulation for identification and the micro-film remains clear so that the surface of the wood is visible through the film for inspection. An antimicrobial is added to the aqueous formulation to stabilize and preserve the micro-film. The micro-film maintains the moisture content in the wood at 16 percent or less.

An advantage of the present invention is that it provides a simple, rapid, and relatively easy method of inhibiting moisture damage to lumber caused by moisture in crawl spaces of building foundations which ranges from 19% to 31%.

Another advantage is a colored micro-film that is clear and allows for continued inspection of a wood surface for termite damage.

Another advantage is that the micro-film does not rub off, get diluted with water, or become damaged by workers and pets who may come into contact with micro-film treated wood.

Another advantage is a micro-film that has a water vapor permeation rate of only 0.48 g per $m^2$ per day compared to 5 g for polyvinyl chloride and 1 g for polyvinylidene chloride.

Another advantage is a micro-film that protects wood exposed to extreme weather conditions.

DETAILED DESCRIPTION OF THE INVENTION

While the following description details the preferred embodiments of the present invention, it is to be understood that the invention is not limited in its application to the details of arrangement of the parts or steps of the methods disclosed herein, since the invention is capable of other embodiments and of being practiced in various ways.

This invention provides a method of treating the surface of wood by applying a micro-film to the surface of wood in crawl spaces of the foundations of buildings. The method produces protection of the wood from damage caused by moisture and provides an easy and quick way of protecting wood in spaces that are difficult to reach or access in crawl spaces of building foundations. The sealant is a long-chain waterborne polymer wax, polymer oil sealant, or a polymer adhesive that protects the entire floor framing system including joists, subflooring, girder beams, sill plate and rim band. The micro-film automatically controls the correct moisture balance for wood to achieve strength, resist environmental issues, and control warp, deflection, deterioration and rot of joists and subfloor materials that make up a building's structural floor and wall framing systems.

Wood is a porous and fibrous structural tissue found in the trunks, stems and roots of trees and other woody plants. It is an organic material, a natural composite of cellulose fibers that are strong in tension and embedded in a matrix of lignin that resists compression. Wood includes, for example, hardwood and softwood lumber directly cut from trees, as well as engineered wood composites made from strands, particles, fibers or veneers of wood. Examples of wood composites include, but are not limited to, plywood, oriented strand board (OSB), medium-density fiberboard (MDF), particle boards, and the like. Exemplary woods include hardwood species such as ash, alder, birch, cherry, mahogany, maple, oak, poplar, teak, hickory and walnut, and softwood species such as cedar, fir, pine and redwood. The wood can be cut or formed into a wide variety of shapes for use as a structural or a building material.

An aqueous formulation of one or more film forming, non-volatile, non-chloride containing, long-chain polymers may be produced by methods well known in the art. The aqueous film forming formulation preferably includes from about 2 to 99 percent by weight (wt %) of the non-chloride containing long-chain polymer component in water, based on the total weight of the aqueous film forming formulation. A preferred non-chloride-containing long-chain polymer is polyethylene vinyl acetate (PEVA), for example, PD-0124 provided by HB Fuller, St Paul Minn. Another preferred non-chloride containing long-chain polymer is polyurethane, for example, U 927 provided by Alberdingk Boley, Greensboro, N.C. These non-chloride-containing long-chain polymers can be used individually or in combination in the aqueous formulation. In combination in the aqueous formulation, preferably, PEVA is 60-70 wt % and polyurethane is 20-26 wt %.

Typical performance enhancing additives may be added as desired to the aqueous formulation such as surface-active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like at about less than 5 wt % of the total formulation.

A film stabilizer, preservative, and antimicrobial, such as zinc oxide, zinc borate, copper salts, or disodium tetraborate can be added to the aqueous formulation. Zinc oxide suppresses bacterial and mold growth in the micro-film and keeps the aqueous formulation stable when the aqueous formulation is sprayed and contacts the surface of wood. These stabilizing agents are added to the aqueous formulation up to 2 wt %.

A colorant is added to the aqueous formulation to color the wood surface in any desired color for identification and certification of application. The micro-film produced by the aqueous formulation is clear and the colorant is clear so that the surface of the wood remains visible through the micro-film allowing termite inspection. A preferred clear colorant is Permelon Orange obtained from Standard Colors, High Point, N.C. The colorant is added to the aqueous formulation up to 2 wt %.

The aqueous formulation described above can be applied on the surface of wood using any suitable procedure such as brush coating, spray coating, roll coating, curtain coating, vacuum coating fan, sock coating and the like. Spraying is a preferred application method.

If desired, the surface of the wood may be cleaned and prepared for application of the disclosed aqueous formulation using methods well known in the art. The coating composition may be applied in one or more layers, with each layer preferably being applied in an amount sufficient to provide complete coverage and a continuous coating. However, one coat is preferred at a wet coating thicknesses of about 1 to 5 mils (about 0.03 mm to about 0.1 mm). The wet coating is allowed to dry and form a micro-film that is non-toxic and without any detectable volatile organic compounds. The micro-film does not rub off, or get diluted with water, or become damaged by workers and pets who may come into contact with the micro-film.

The effectiveness of the aqueous film forming formulation of this invention can be tested using a FLIR MR 160 Imaging Moisture Meter (https://www.flir.com/instruments/moisture-restoration). Typically, readings of more than 16% moisture content (absorption), season after season, can weaken structural lumber, leading to deterioration, infestation of wood destroying organisms, and interior damage costing tens of thousands of dollars to repair. Actual moisture content meter readings show that common visqueen or polyethylene plastic on the ground, poured concrete and pack-filled dirt or other expensive methods show failure to regulate moisture content adequately, causing weaker wood strength, subfloor warping and deflecting or sagging joists.

To demonstrate the effectiveness of the aqueous film forming formulation of this invention, the formulation was sprayed on a surface of wood in a crawl space. The moisture content of the wood before applying the aqueous film forming formulation was measured with a FLIR meter and was 19.3%. 72 hours after applying the aqueous film forming formulation the moisture content of the wood was again measured and was reduced to 11.1%.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, The aqueous film forming formulation may be applied to any wood surface in any location. Any type of liquid tint, powder pigment, or other additive clear coloring materials may be used to achieve any desired color of the resulting micro-film formed on the wood surface.

It will be understood that various changes in the details of the method and materials which have been described and illustrated above in order to explain the nature of this invention may be made by those skilled in the art without departing from the principle and scope of the invention as recited in the following claims.

We claim:

1. A method of treating a surface of wood to inhibit the uptake of moisture into the wood, the method comprising:
   1) providing an aqueous formulation comprising polyethylene-vinyl acetate in water, 2-99 percent polyethylene-vinyl acetate by weight;
   2) entering a crawl space of a foundation of a building and spraying the aqueous formulation on the surface of the wood in the crawl space; and
   3) allowing the aqueous formulation to dry and form a micro-film on the surface of the wood.

2. The method of claim 1 wherein the wood is exterior wood outside of the building.

3. The method of claim 2 wherein the wood includes a floor framing system having joists, subflooring, and girder beams in the crawl space of the foundation of the building.

4. The method of claim 1 wherein the micro-film contains no detectable volatile organic compounds.

5. The method of claim 1, further comprising adding a clear coloring agent to the aqueous formulation up to 2 percent by weight, wherein the micro-film remains clear and the surface of the wood is visible through the micro-film, and inspecting the wood through the micro-film.

6. The method of claim 1, further comprising adding an antimicrobial to the aqueous formulation up to 2 percent by weight.

7. The method of claim 1, further comprising maintaining the moisture content in the wood at 16 percent or less and inhibiting rot of joists and subfloor materials.

8. A method of treating a surface of wood to inhibit the uptake of moisture into the wood, the method comprising:
   1) providing an aqueous formulation comprising polyethylene-vinyl acetate in water, 2-99 percent polyethylene-vinyl acetate by weight;
   2) entering a crawl space of a foundation of a building and spraying the aqueous formulation on the surface of the wood located outside of the building in the crawl space; and
   3) allowing the aqueous formulation to dry and form a micro-film on the surface of the wood,
      wherein the wood includes a floor framing system having joists, subflooring, and girder beams in the crawl space of the building, and
      wherein the micro-film contains no detectable volatile organic compounds.

9. The method of claim 8 further comprising adding a clear coloring agent to the aqueous formulation up to 2 percent by weight, wherein the micro-film remains clear and the surface of the wood is visible through the micro-film, and inspecting the wood through the micro-film.

10. The method of claim 8, further comprising adding zinc oxide as an antimicrobial to the aqueous formulation up to 2 percent by weight.

11. The method of claim 8, further comprising maintaining the moisture content in the wood at 16 percent or less and inhibiting rot of joists and subfloor materials.

12. A method of treating a surface of wood to inhibit the uptake of moisture into the wood, the method comprising:
   1) Providing an aqueous formulation comprising polyethylene-vinyl acetate in water, 2-99 percent polyethylene-vinyl acetate by weight;
   2) adding a clear coloring agent to the aqueous formulation up to 2 percent by weight, wherein the micro-film remains clear and the surface of the wood is visible through the micro-film, and inspecting the wood through the micro-film;
   3) adding zinc oxide as an antimicrobial to the aqueous formulation up to 2 percent by weight;
   4) entering a crawl space of a foundation of a building and spraying the aqueous formulation on the surface exterior the wood in the crawl space located outside of the building wherein the wood includes a floor framing system having joists, subflooring, and girder beams in the crawl space of the foundation of the building; and
   5) allowing the aqueous formulation to dry and form a micro-film on the surface of the exterior wood.

13. The method of claim 12 wherein the micro-film contains no detectable volatile organic compounds.

14. The method of claim 13, further comprising maintaining the moisture content in the wood at 16 percent or less and inhibiting rot of joists and subfloor materials.

* * * * *